United States Patent
Baudendistel et al.

(10) Patent No.: US 7,527,130 B2
(45) Date of Patent: May 5, 2009

(54) HARMONIC DRIVE LINEAR ACTUATOR

(75) Inventors: Thomas A. Baudendistel, Farmersville, OH (US); Harald Klode, Centerville, OH (US)

(73) Assignee: Delphi Technologies, Inc., Troy, MI (US)

( * ) Notice: Subject to any disclaimer, the term of this patent is extended or adjusted under 35 U.S.C. 154(b) by 379 days.

(21) Appl. No.: 11/412,057

(22) Filed: Apr. 26, 2006

(65) Prior Publication Data
US 2006/0288816 A1 Dec. 28, 2006

Related U.S. Application Data

(60) Provisional application No. 60/676,181, filed on Apr. 29, 2005, provisional application No. 60/691,144, filed on Jun. 16, 2005.

(51) Int. Cl.
*F16D 55/08* (2006.01)

(52) U.S. Cl. ..................... 188/72.8; 188/158

(58) Field of Classification Search ......... 188/158–162, 188/72.7–72.8; 310/83, 323.02; 74/89.15, 74/89.23, 640
See application file for complete search history.

(56) References Cited

U.S. PATENT DOCUMENTS

| | | | |
|---|---|---|---|
| 2,849,897 A | 9/1958 | Walma | 74/804 |
| 3,058,372 A | 10/1962 | Robinson | 74/640 |
| 3,117,468 A | 1/1964 | Musser | 74/640 |
| 3,160,032 A | 12/1964 | Black | 74/804 |
| 3,178,963 A | 4/1965 | Musser | 74/640 |
| 3,187,605 A | 6/1965 | Stiff | 74/640 |
| 3,199,370 A | 8/1965 | Prior | 74/640 |
| 3,363,484 A | 1/1968 | Slaughter | 74/800 |
| 3,374,372 A | 3/1968 | Tinder et al. | 310/80 |
| 3,427,898 A | 2/1969 | Mayer | 74/640 |
| 3,482,770 A | 12/1969 | Nelson | 74/640 |
| 3,501,978 A | 3/1970 | Ferrell | 74/640 |
| 3,524,362 A | 8/1970 | Hugel | 74/796 |
| 3,529,491 A | 9/1970 | Stauber | 74/640 |
| 3,532,005 A | 10/1970 | Bremner, Jr. et al. | 74/640 |
| 3,561,006 A | 2/1971 | Humphreys | 310/82 |
| 3,604,287 A | 9/1971 | Humphreys | 74/640 |
| 4,619,156 A | 10/1986 | Kiryu | 74/640 |
| 4,950,135 A | 8/1990 | Tojo et al. | 417/410 |

(Continued)

OTHER PUBLICATIONS

Scientific American, Mar. 2006, pp. 96 & 97.

*Primary Examiner*—Christopher P Schwartz
(74) *Attorney, Agent, or Firm*—Thomas N. Twomey

(57) ABSTRACT

A harmonic drive linear actuator includes a first annular member defining a longitudinal axis and lying on a plane, which is perpendicular to the longitudinal axis. The first member is relatively flexible along a direction parallel to the plane. A second member is substantially coaxially aligned with the first member to define opposed substantially cylindrical surfaces and are fixed for non-relative rotation about the longitudinal axis. An actuator is provided for flexing the first annular member into at least two spaced-apart points of contact between the opposed surfaces and for sequentially flexing the first member to rotate the at least two points of contact circumferentially about the axis. The first and second surfaces define cooperating thread-forms thereon, which selectively engage to effect controlled, bidirectional relative axial displacement between the members in response to sequential flexure of the first member. The linear actuator can be conjoined with an actuator piston of a vehicle brake caliper assembly.

22 Claims, 4 Drawing Sheets

U.S. PATENT DOCUMENTS

| | | | |
|---|---|---|---|
| 5,079,471 A | 1/1992 | Nygren, Jr. | 310/328 |
| 5,093,594 A | 3/1992 | Mehregany | 310/82 |
| 5,148,068 A | 9/1992 | Kushida et al. | 310/46 |
| 5,237,234 A | 8/1993 | Jebens et al. | 310/309 |
| 5,378,948 A | 1/1995 | Richter | 310/328 |
| 5,854,528 A | 12/1998 | Nishikura et al. | 310/323 |
| 6,030,054 A * | 2/2000 | Doericht | 303/20 |
| 6,098,479 A * | 8/2000 | Hoermansdoerfer | 74/424.92 |
| 6,153,988 A * | 11/2000 | Reimann et al. | 318/5 |
| 6,369,477 B1 | 4/2002 | Bonin | 310/156.01 |
| 6,394,235 B1 * | 5/2002 | Poertzgen et al. | 188/72.6 |
| 6,626,270 B2 | 9/2003 | Drennen et al. | 188/72.1 |
| 6,664,711 B2 * | 12/2003 | Baudendistel | 310/323.02 |
| 6,679,356 B2 | 1/2004 | Hageman et al. | 188/156 |
| 6,772,655 B2 * | 8/2004 | Poehlau | 74/640 |
| 6,893,371 B2 * | 5/2005 | Mills et al. | 475/149 |
| 2005/0124452 A1 | 6/2005 | Stoianovici et al. | 475/83 |
| 2005/0253675 A1 | 11/2005 | Davison | 335/220 |
| 2005/0288143 A1 | 12/2005 | Menjak et al. | 475/29 |

* cited by examiner

HARMONIC DRIVE LINEAR ACTUATOR

RELATED PATENT APPLICATIONS

This application claims priority to U.S. provisional patent applications Ser. No. 60/676,181 filed 29 Apr. 2005, entitled "Harmonic Linear Actuator" and Ser. No. 60/691,144 filed 16 Jun. 2005, entitled "Harmonic Linear Actuator and Flexing Splined Interlock for Harmonic Motor or Linear Actuator."

TECHNICAL FIELD

The present invention relates to electro-mechanical actuators, and particularly to linear actuators. More particularly still, the present invention relates to the application of harmonic drives as linear actuators and the adaptation thereof for automotive applications.

BACKGROUND OF THE INVENTION

Harmonic drives have been used as motors and actuators in many electro-mechanical applications. One type of harmonic motor has a rotatable rotor and a surrounding non-rotatable stator. The rotor makes a single point of contact with the inner circumference of the stator. The single point of contact rotates around (i.e. rolls around) the inner circumference of the stator. The rotor rotates a few degrees about its longitudinal axis for each complete rotation of the single point of contact about the inner circumference of the stator. In one modification, the outer circumference of the rotor and the inner circumference of the stator have gear teeth. Such motors find use in high torque, low speed motor applications.

In one known variation, the rotatable rotor is above a non-rotatable stator, the rotatable rotor flexes or wobbles downward to make a single point of contact with the stator, the single point of contact rotates around an "inner circumference" of the stator, and the rotor rotates a few degrees about its longitudinal axis for each complete rotation of the single point of contact.

In another type of harmonic motor, a shaft is surrounded by a shaft driving member which is brought into a single point of contact with the shaft by electro-restrictive devices, wherein the rotor rotates a few degrees for each complete rotation of the single point of contact around the inner circumference of the shaft driving member.

Harmonic drive gear trains are known. In one known design, a motor rotates a "wave generator" which is an egg-shaped member, which flexes diametrically opposite portions of the surrounding flex-spline gear, which is inside an inner gear. As the diametrically opposite teeth of the flex-spline gear contact the teeth of the outer gear, the rotatable one of the gears rotates with respect to the non-rotatable one of the gears.

U.S. Pat. No. 6,664,711 to T. Baudendistel describes a harmonic motor which includes a first annular member, a second member, and a device for flexing the first annular member. One of the members is rotatable about the motor's longitudinal axis, and the other member is non-rotatable. The flexing device flexes the first annual member into at least two spaced-apart points of contact with the second member, and sequentially flexes the first annular member to rotate the at least two spaced-apart points of contact about the longitudinal axis which rotates the rotatable one of the members about the longitudinal axis.

By using at least two points of contact between the members, the rotatable one (i.e., the rotor) is being driven by at least two points of contact by the non-rotatable one (i.e. the stator or rotor driving member). Driving the motor with at least two points of contact provides a more robust and more smoothly operating motor than is otherwise provided by the prior art.

In certain applications, linear actuators are preferred to motors. For example, a brake system for a motor vehicle, and in particular an automotive vehicle, functionally reduces the speed of the vehicle or maintains the vehicle in a rest position. Various types of brake systems are commonly used in automotive vehicles, including hydraulic, anti-lock or "ABS", and electric or "brake by wire". For example, in a hydraulic brake system, the hydraulic fluid transfers energy from a brake pedal to a brake pad for slowing down or stopping rotation of the wheel of the vehicle. Electronic systems control the hydraulic fluid in the hydraulic brake system. In the electric brake system, the hydraulic fluid is eliminated. Instead, the application and release of the brake pad is controlled by an electric caliper.

Generally, the electric caliper includes a motor and a gear system. Typically, either a few large gears or many small gears for the gear system are needed to achieve the necessary load transfer. Also, the geometry of the motor influences its efficiency, since the preferred shape is long and thin. However, there is a limited amount of space available in the wheel for packaging the type of gears and motor necessary to obtain the same load transfer as in the hydraulic brake system. Therefore, space limitations constrain the use of an electric caliper in an automotive vehicle.

U.S. Pat. No. 6,626,270 to D. Drenner et al. describes a brake caliper which includes an electric motor having a shaft and an associated gear system including first and second planetary gears rotatable engaged with the motor shaft. At least one of the planetary gears is engaged with the shaft and a piston, and is operatively engaged with a first carrier. The other planetary gear is operatively engaged with the first stage carrier and a second carrier. A ball screw is engaged with the second stage carrier for rotation therewith, and a ball screw nut is operatively engaged with the ball screw.

Although having many advantages to mechanical brake systems, more recent prior art systems based upon hydraulic pressure behind a piston or, alternatively, an electric motor employed to turn a ballscrew to move a piston to create clamping force in a brake caliper also have drawbacks. Hydraulic brake systems employ a closed hydraulic system filled with hydraulic fluid to control the piston. This approach, although currently common in the industry, can present adverse environmental, assembly, control and safety aspects. Likewise, the electro-mechanical system approach employs multiple parts, which have certain inefficiencies, namely a motor, planetary gear set and ballscrew. These components, in addition to being expensive and difficult to assemble and maintain, also can have the disadvantage of high inertia and back-drivability resistance.

It is, therefore, a primary object of the present invention to provide an improved harmonic drive configured as a linear actuator suitable for automotive brake caliper applications in brake by wire systems, which overcomes known shortfalls of existing devices without adding to part count, manufacturing complexity, cost or reduced robustness.

SUMMARY OF THE INVENTION

Generally, the present invention fulfills the forgoing needs by providing, in one aspect thereof, a robust, compact harmonic drive linear actuator, suitable for application as a piston in the brake caliper assembly of an automotive brake by wire system. The linear actuator provides the benefits of having high force output with virtually no inertia and zero back-drivability while decreasing the component count, weight and cost in a compact, easily packagable and robust design.

The presently inventive harmonic drive actuator includes a first annular member defining a longitudinal axis which lies on a plane perpendicular to the longitudinal axis, and wherein the first annular member is relatively flexible along a direction which lies in the plane. A second member is substantially coaxially aligned with the first member and also lies on the plane. The first and second members define opposed substantially cylindrical surfaces, which are fixed for non-relative rotation about the longitudinal axis. Finally, means are provided for flexing the first annular member into at least two spaced-apart points of contact between the surfaces and for sequentially flexing the first annular member to rotate the at least two points of contact circumferentially about the longitudinal axis. The surfaces define cooperating thread-forms thereon which selectively engage to effect relative axial displacement between the first and second members in response to sequential flexure of the first annual member. This arrangement provides a high force, low cost, simple linear actuator, which is compact and easily packaged within the envelope of a traditional automotive brake caliper.

According to another aspect of the invention, the second member is relatively rigid and lies on the plane perpendicular to the longitudinal axis. This allows the cylindrical surface defined by the second member to be formed by a structural member to facilitate packaging of the linear actuator.

According to another aspect of the invention, the linear actuator further includes means to limit axial displacement of one of the annular members with respect to an adjacent grounded member. Furthermore, the other annular member defined means for urging a load in at least one direction parallel to the longitudinal axis. This feature further enhances adaptability and packaging of the inventive harmonic drive actuator.

According to still another aspect of the invention, the means for flexing the first annular member is operable to effect selective bi-directional relative longitudinal displacement between the first and second annular members. This enhances operating speed and ensures against inadvertent lock-up of an associated brake system.

According to yet another aspect of the invention, the second annular member defines a rigid, generally cup-shaped member, and the first annular member as well as the means for flexing the first annular member are disposed substantially within the second annular member. This arrangement enhances robustness by protecting the moving parts as well as miniaturization of the linear actuator.

According to still yet another aspect of the invention, the means for flexing the first annular member is responsive to an electrical control signal, and is operative to effect radial disengagement of the thread-forms in response to the absence of the control signal, whereby the first and second members are freely axially displaceable with respect to one another. This arrangement has the advantage of providing a "fail silent" operation whenever the actuator is not energized, eliminating many adverse potential failure modes.

Application of the invention is particularly advantageous for use in brake caliper assemblies for passenger vehicles. Such an apparatus comprises a brake caliper for applying a clamp load along an actuation axis, a piston slidably disposed in a bore concentric with the axis for applying the clamp load, and a harmonic drive linear actuator disposed for acting upon the piston and an opposed substantially grounded caliper surface. Preferably, elements of the linear actuator are conjoined with the piston. This arrangement provides a robust, high force compact brake actuator.

These and other features and advantages of this invention will become apparent upon reading the following specification, which, along with the drawings, describes preferred and alternative embodiments of the invention in detail.

BRIEF DESCRIPTION OF THE DRAWINGS

The present invention will now be described, by way of example, with reference to the accompanying drawings, in which.

Although the drawings represent embodiments of the present invention, the drawings are not necessarily to scale and certain features may be exaggerated in order to illustrate and explain the present invention. The exemplification set forth herein illustrates an embodiment of the invention, in one form, and such exemplifications are not to be construed as limiting the scope of the invention in any manner.

DESCRIPTION OF THE PREFERRED EMBODIMENT

The present invention is intended for application in varied automotive vehicle applications and will be described in that context. It is to be understood, however, that the present invention could also be successfully applied in many other applications. Accordingly, the claims herein should not be deemed limited to the specifics of the preferred embodiment of the invention described hereunder.

Figure 1:
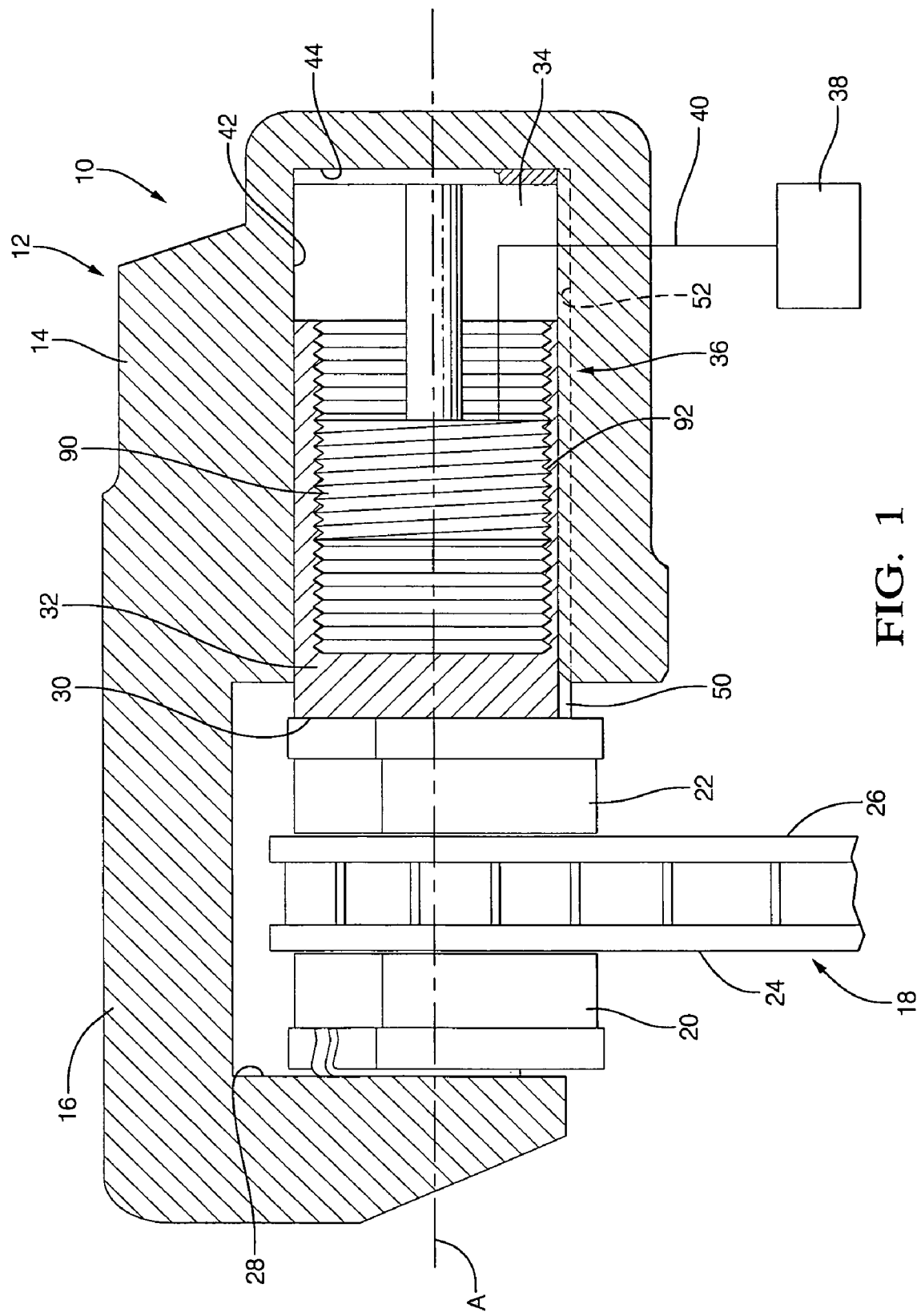
FIG. 1, is a broken, sectional view of the preferred embodiment of a harmonic drive linear actuator employed within a brake by wire system of an automotive vehicle.

Referring to FIG. 1, a preferred environment and application of the present invention within the brake system of a passenger vehicle is illustrated. A brake caliper apparatus 10 may include mounting means (not illustrated) for grounding or securing the caliper apparatus 10 to the chassis of a motor vehicle in a manner well known in the art. The caliper apparatus 10 consists of a one-piece cast iron body 12 having an actuator housing portion 14 and an integral brake pad positioning/support portion 16. In application, the body 12 is disposed adjacent the radially outermost portions of a brake disc 18 which is mounted for rotation with an associated vehicle wheel (not illustrated).

Caliper apparatus 10 supports and positions opposed outer and inner brake pads 20 and 22, respectively, which are positioned to straddle and selectively engage outer and inner surfaces 24 and 26, respectively, of brake disc 18. Outer brake pad 20 is mounted on a rightwardly facing thrust surface 28 of support portion 16 and inner brake pad 22 is mounted on a leftwardly facing thrust surface 30 of a piston 32. Piston 32 is slip fit within a blind bore 34 formed within housing portion 14 of body 12, opening leftwardly toward brake disc 18.

As will be described in detail herein below, a harmonic drive linear actuator 36 is disposed within bore 34 and is operable to displace the piston 32 and inner brake pad 22 bi-directionally along a longitudinal axis designated A-A. As illustrated in FIG. 1, brake caliper apparatus 10 is in a released or non-braking condition, wherein the brake pads 20 and 22 are axially displaced a small distance from surfaces 24 and 26 of brake disc 18. In this condition, brake disc 18 is free to rotate about its axis of rotation (not illustrated), which is substantially parallel to actuation axis A-A.

When braking of a host vehicle is desired, a vehicle braking control system 38 applies a control signal via a line 40 to provide electrical power to linear actuator 36. Linear actuator 36 then drives the piston 32 and brake pad 22 leftwardly along axis A-A, causing brake pads 20 and 22 to apply opposed clamping forces upon surfaces 24 and 26, respectively, of brake disc 18. The amount of force applied by the linear actuator 36 will translate through thrust surfaces 28 and 30 to control the frictional braking forces applied to the brake disc 18 by the brake pads 20 and 22.

Blind bore 34 is defined by a cylindrical wall surface 42 which is concentric with axis A-A, and an end wall surface 44 which is normal to axis A-A. Piston 30 is generally cylindrical in shape and dimensioned for a precise slip-fit within bore 34. Due to the harsh environment in which the present invention is applied, it is contemplated that a flexible seal will be provided between the piston 32 and the housing portion 14 to prevent the ingress of brake system related debris, environmental contamination or moisture.

Figure 2:
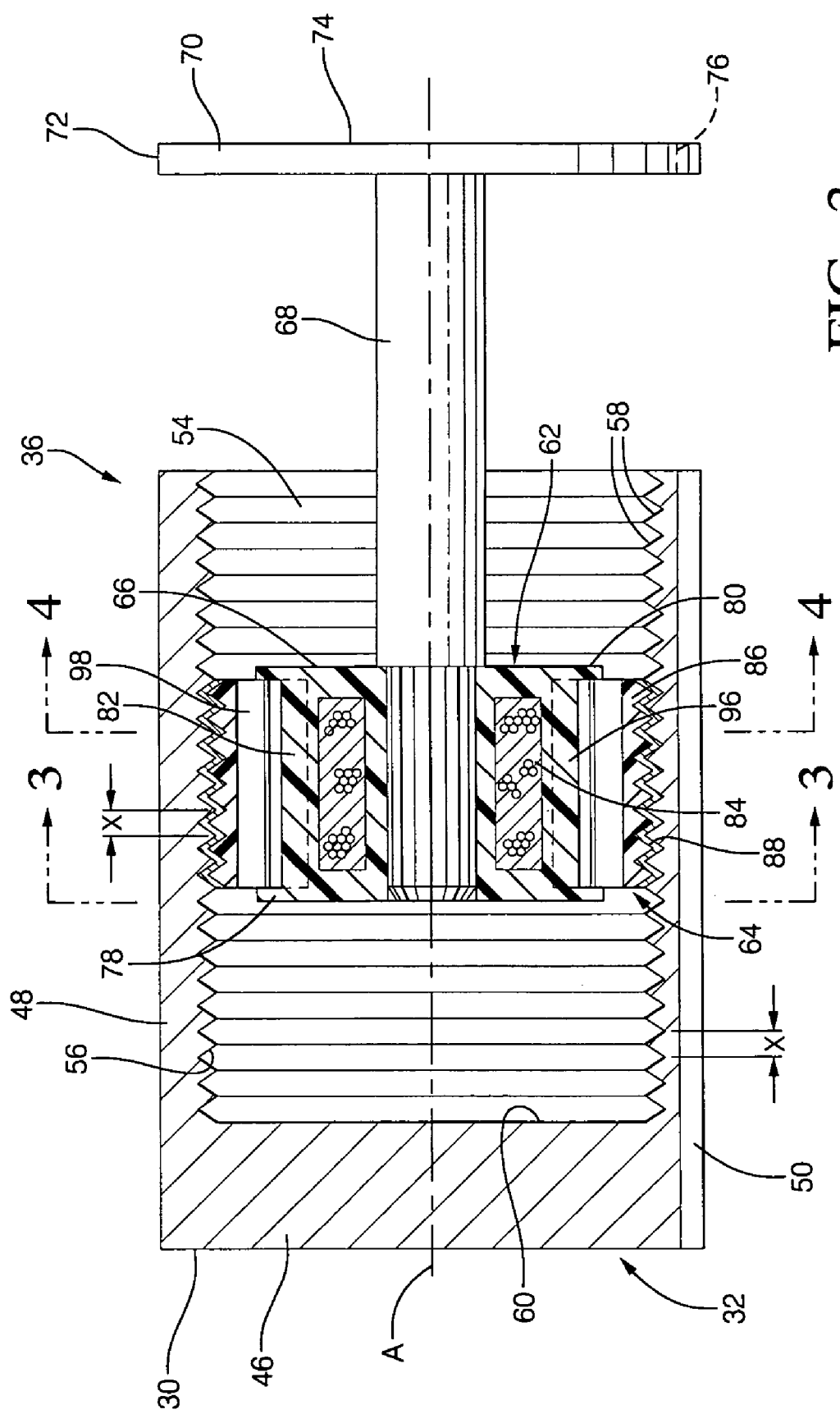
FIG. 2, is a cross-sectional view of the harmonic drive linear actuator of FIG. 1, on an enlarged scale.

Referring to FIGS. 1 and 2, piston 32 and linear actuator 36 are integrally formed as a single subassembly, which, in the preferred application, is substantially entirely disposed within bore 34 of body 12 of caliper system 10. Piston 32 is generally cup-shaped, comprising a cylindrical head portion 46 and a circumferential skirt portion 48 integrally formed therewith. The outer surface of head portion 46 forms thrust surface 30. A keyway 50 is formed in the outer surface of skirt portion 48, which extends the entire axial length thereof. Keyway 50 mates with a radially inwardly directed guide ridge 52 formed in wall surface 42 of bore 34. Keyway 50 and guide ridge 52 cooperate to prevent relative rotation and limit piston 32 to axial displacement within bore 34.

The inner surfaces of head portion 46 and skirt portion 48 of piston 32 define a rightwardly opening cylindrical cavity 54. The inner surface 56 of skirt portion is formed as a succession of concentric, equally dimensioned V-grooves 58, which are flat walled, and form an overall "sawtooth" configuration with a constant trough-to-trough axial dimension designated "X". Collectively, the V-grooves are designated as a thread-form with zero pitch. The inner surface 60 of head portion 46 establishes an axial limit of travel for linear actuator 36 as will be described herein below. The entire piston 32 is constructed of machined steel or other suitable material producing a robust, substantially rigid structure.

Figure 3:
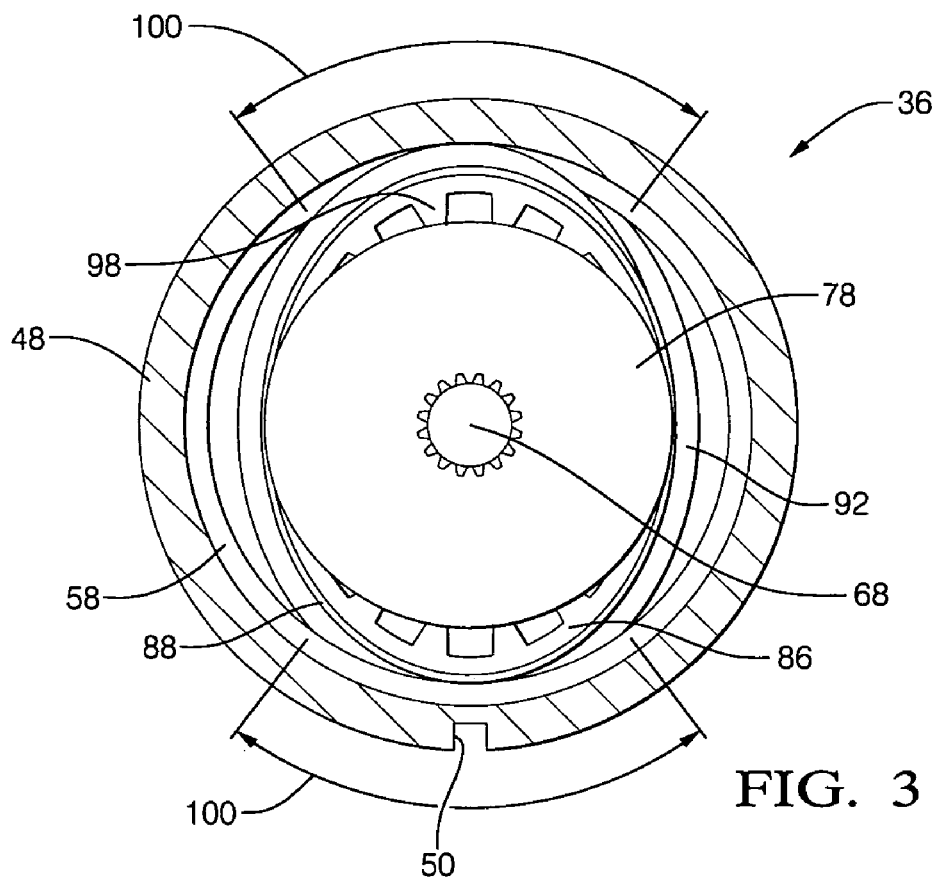
FIG. 3, is a cross-sectional view taken on lines 3-3 of FIG. 2.
Figure 4:
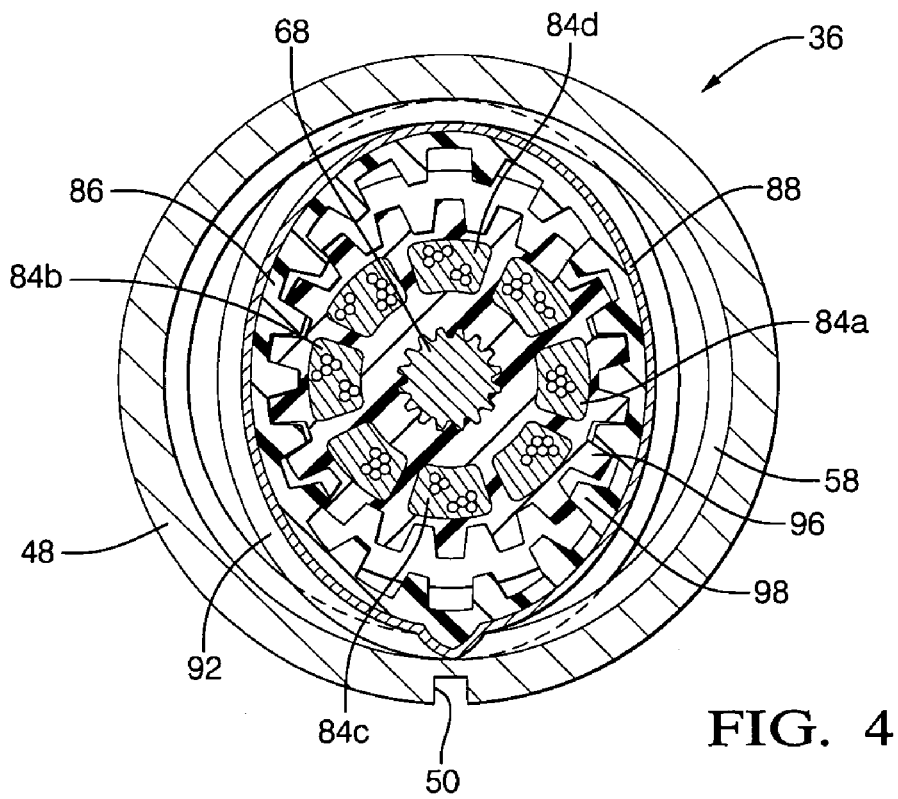
FIG. 4, is a cross-sectional view taken on lines 4-4 of FIG. 2.

Referring to FIGS. 2-4, the structure and operation of linear actuator 36 are illustrated. In addition to the skirt portion 48 of piston 32, the linear actuator 36 includes an electromagnetic actuator assembly 62 and a flexible annular member 64 disposed generally concentrically within cavity 54 of piston 32. Electromagnetic actuator assembly 62 includes an armature body 66 fixedly mounted to a splined end of an axially elongated support member 68. The opposite end of support member 68 is affixed to a base plate 70. Base plate 70 is disc-shaped having an outer circumferential surface 72 dimensioned similarly to piston skirt portion 48 for slip-fit within bore 34 of brake caliper 10 (FIG. 1). In application, the large leading (right-hand as viewed in FIG. 2) surface 74 of base plate 70 abuts end wall surface 44 of caliper bore 34 to distribute braking forces and to maintain precise axial alignment of linear actuator 36 within bore 34. A keyway 76 is formed in circumferential surface 72, which registers with guide ridge 52. Thus configured, electromagnetic actuator assembly 62, including support member 68 and base plate 70, is grounded or fixed from relative rotation with respect to the brake caliper 10.

Armature body 66 is generally spool-shaped, including integral leading and trailing radially outwardly extending flange portions 78 and 80, respectively, and a reduced diameter central body portion 82. A plurality of electrical coils or windings 84 are insulatively disposed within central body portion 82 and are each electrically in-circuit with control system 38 via lines 40 (FIG. 1) to define a discrete number of circumferentially arranged poles.

Flexible annular member 64 is an open-ended cylinder, which is carried by actuator assembly 62. Annular member 64 is a bonded composite of a thick-walled inner ring 86 formed of relatively flexible material, and a relatively thin-walled outer ring 88 having ferro-magnetic properties. Annular member 64 is dimensioned whereby its effective inner diameter is somewhat greater than that of the central body portion 82 of armature body 66, but somewhat lesser than the effective outer diameter of flange portions 78 and 80. Annual member 64 is axially straddled by flange portions 78 and 80 and has an axial dimension to establish a slip-fit therebetween. Thus configured, annular member 64 is captured and carried by electromagnetic actuator assembly 62, having no relative freedom of travel in either axial direction and limited relative radial freedom of travel.

Referring to FIGS. 1 and 2, the outer ring 88 of flexible annular member 64 has an outer surface 90 in which is defined a thread-form 92. Thread-form 92 is illustrated as a dual helix with a constant trough-to-trough dimension designated "X". Thus, the pitch of thread-form 92 will result in a relative axial displacement between piston 32 and flexible annular member 64 of "2X" in single 360° point of contact rotation. It is contemplated, however, that differing combinations of thread-forms 58 and 92 can be applied depending upon such variables as clamping force requirements, actuation speed, range of axial displacement, overall diameter of the piston, and the like, as will be apparent to one skilled in the art in light of the present specification.

Figure 5:
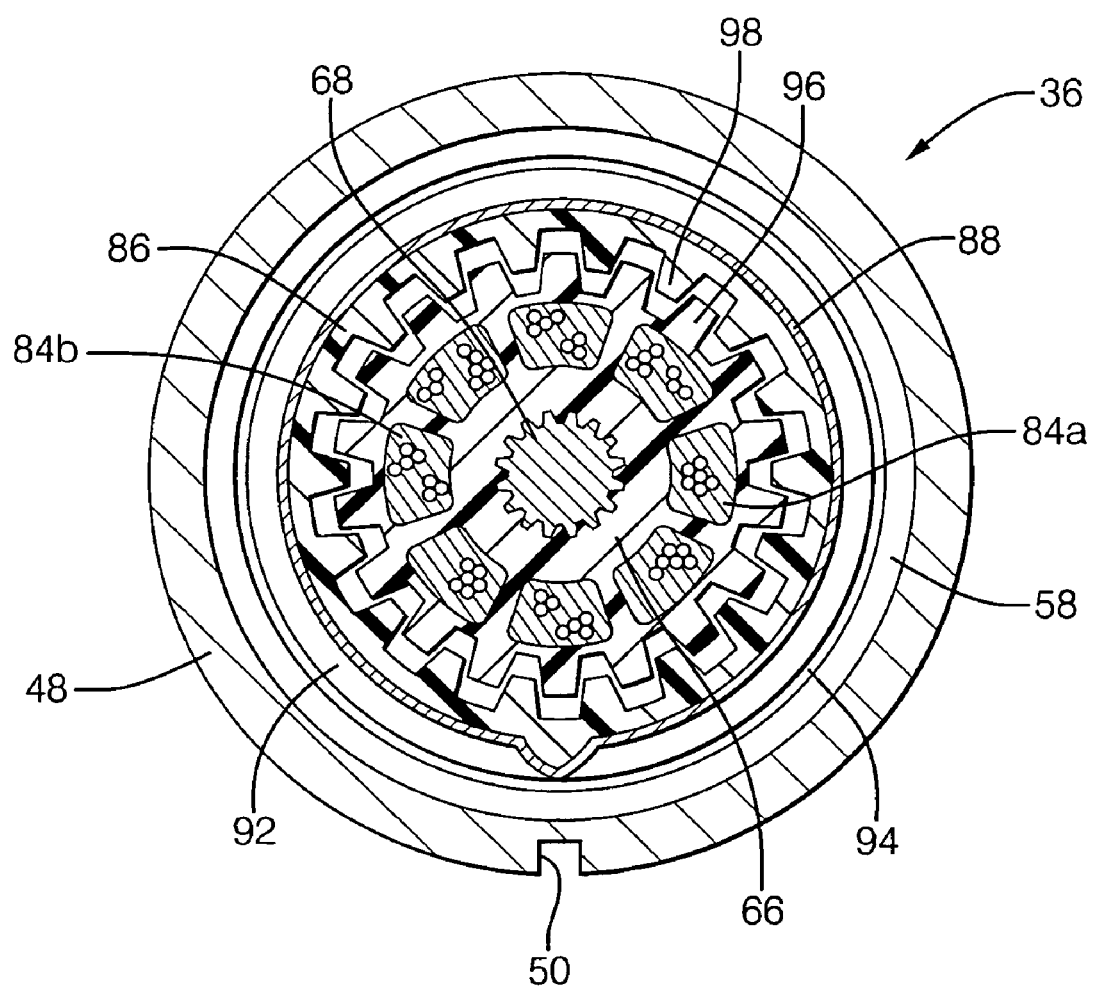
FIG. 5, is a cross-sectional view similar to that of FIG. 4, but where the harmonic drive linear is de-activated.

As best viewed in FIG. 5 where annular member 64 is in a relaxed position, i.e. when none of the electrical coils 84 are electrically energized, member 64 assures a substantially round configuration. Insodoing, a radial space 94 is established between the radially innermost portion of V-grooves/ thread-form 58 of surface 56 of skirt portion 48 and the radially outermost portion of thread-form 92 of outer surface 90 of annular member 60. In this condition, the flexible annular member 64 and electromagnetic actuator assembly 62 is entirely mechanically de-coupled from the piston 32, and the piston 32 is free for unrestrained axial movement within bore 34 of brake caliper 10. This releases any brake clamping forces the caliper assembly 10 may have been applying upon the brake disc 18.

Keyways 50 and 76 are continuously engaged with guide ridge 52 independent of their respective axial position within bore 34 of brake caliper. Thus, they are mutually rotatively fixed.

The outer circumferential surface of the central body portion 82 of armature body 66 defines a plurality of axially elongated, radially outwardly directed tapered cogs 96 integrally formed therewith. Likewise, the inner circumferential surface of inner ring 86 of flexible annular member 64 defines a plurality of axially elongated, radially inwardly directed tapered cogs 98 integrally formed therewith. The cogs 96 and 98 are complimentarily shaped and circumferentially distributed and interdigitated, as best illustrated in FIG. 5. The cogs prevent relative rotation between electromagnetic actuator assembly 62 and flexible annular member 64, while permitting the limited radial displacement therebetween as described herein above. The axial end surfaces of the cogs 96 and 98 also increase the effective surface area for transferring linear actuator generated axial clamping forces between the electromagnetic actuator assembly 62 and the flexible annular member 64.

Referring to FIGS. 2-4, the harmonic drive linear actuator functions by selectively energizing opposed coil pairs within actuator assembly 62. For example, if an opposed pair of coils 84a and 84b are energized, they create a magnetic field which attracts nearby portions of the flexible annular member 64, causing it to distend from the relaxed condition depicted in FIG. 5 into the elongated or egg-shaped configuration of FIG. 4. In FIG. 4, the portions of the flexible member 64 are drawn radially inwardly into intimate contact with the outer peripheral surface of central body portion 82 of armature body 66 and are rotatively locked together by the engagement of cooperating cogs 96 and 98. Simultaneously, opposed (by 90°) portions of the flexible member 64 are deformed radially outwardly into intimate contact with inner surface 56 of skirt portion 48 of piston 32. This engagement can be supplemented by magnetic repulsion of adjacent reverse polarized coils 84c and 84d.

When flexible annular member 64 is distended as illustrated in FIGS. 1-4, opposed segments of the tread-form 92 momentarily engage adjacent segments of V-grooves/thread-form 58 to axially lock the flexible annular member 64 with the skirt portion 48. The areas of engagement are depicted in FIG. 3 as opposed arcuate segments 100. Whenever the coils 84 are de-energized, the flexible member 64 returns to the configuration depicted in FIG. 5 due to the resiliency of its construction.

The electrical control of harmonic motors and actuators is well known. For example, U.S. Pat. No. 6,664,711 B2 and U.S. Patent Application 2005/0253675 A1 describe harmonic motors and electrical controllers therefore which can be adopted for use with the present invention. U.S. Pat. No. 6,664,711 B2 and U.S. 2005/0253675 A1 are hereby incorporated herein by reference as an exemplary teaching of one possible approach. It is to be understood that they reflect only one of many possible control strategies. Furthermore, other methodologies for sequentially flexing the flexing member such as mechanical, electrical or electromagnetic could be implemented without departing from the spirit of the invention.

In summary, the piston 32 and linear actuator are locked together for relative non-rotation. When the electrical coils 84 are sequentially energized, the localized opposed areas of contact of the opposed thread-forms "walks around" the circumference of the linear actuator 36, and thereby axially advancing or retracting the piston 32 with respect to the brake caliper body 10. The inventive linear actuator therefore has very low inertia, excellent back-drivability, a lowered part count (compared to a ball-screw approach) for reliable operation and high linear force output.

The only inertia in the device is in the internal actuator employed for flexing or deforming the "flex-tube". Preferably, this is accomplished electro-magnetically, to virtually eliminate related moving parts. This allows almost instantaneous direction reversal of the linear actuator 36. The zero back-driveability is achieved by effecting disengagement of the piston 32 with the actuator 36 whenever power is lost, thereby allowing the piston to float.

The structure of the present invention is extremely simple, including only an actuator, a flex-tube and a piston.

The linear displacement of the actuator is effectively one thread width per revolution. The gain of the actuator can be changed simply by changing the pitch or lead angle of one or both of the thread-forms 58 and 92.

As an analogy, the present invention operates as a "nut" and "bolt", with the exception that they are in contact in only a limited number of opposing points. The flexible annular member 64 serves as an out-of-round "nut" which preferably contacts the mating "bolt" in only two points, which are 180° apart. The load capacity or limit is effectively reduced as a result of the reduced surface contact area between the "bolt" and out-of-round "nut". However, this can be accommodated by thickening the "nut" in its axial dimension, i.e. increasing the number of threads and thus the number of thread segments which are engaged with the "bolt" at any given time. As a next step, the threads of the out-of-round "nut are cut as a succession of concentric grooves which are perpendicular to the axis. Assuming that the lead angle and contact circumference is compatible, if the "nut" is turned, the same axial displacement will occur. Finally, instead of spinning the "nut", the "nut" is held stationary and deformed by changing the minor axis of orientation. In other words, the "nut" is sequentially squeezed, first at a 12 o'clock orientation, then a 1 o'clock orientation, then a 2 o'clock orientation, and so on. Because the "nut" cannot move axially or linearly, the "bolt" will be displaced axially, but without relative rotation.

It is to be understood that the invention has been described with reference to specific embodiments and variations to provide the features and advantages previously described and that the embodiments are susceptible of modification as will be apparent to those skilled in the art.

Furthermore, it is contemplated that many alternative, common inexpensive materials can be employed to construct the basic constituent components. Accordingly, the forgoing is not to be construed in a limiting sense.

The invention has been described in an illustrative manner, and it is to be understood that the terminology, which has been used is intended to be in the nature of words of description rather than of limitation.

Obviously, many modifications and variations of the present invention are possible in light of the above teachings. For example, mechanical, hydraulic or other prime movers can be employed to affect the sequenced flexure of the first annular member. It is, therefore, to be understood that within the scope of the appended claims, wherein reference numerals are merely for illustrative purposes and convenience and are not in any way limiting, the invention, which is defined by the following claims as interpreted according to the principles of patent law, including the Doctrine of Equivalents, may be practiced otherwise than is specifically described.

The invention claimed is:

1. A harmonic drive linear actuator comprising:
a first annular member having a longitudinal axis, wherein the first annular member lies in a plane perpendicular to the longitudinal axis, and wherein the first annular member is relatively flexible along a direction which lies in the plane;
a second annular member substantially coaxially aligned with the first annular member and lying in the plane, wherein said first and second annular members define first and second opposed substantially cylindrical surfaces and are fixed for non-relative rotation about the longitudinal axis; and
means for flexing the first annular member into at least two spaced-apart points of contact between said first and second surfaces and for sequentially flexing the first annular member to rotate the at least two points of contact circumferentially about the longitudinal axis, said first and second surfaces defining cooperating thread-forms thereon extending circumferentially about said longitudinal axis which selectively engage to effect relative axial displacement between said first and second annular members in response to sequential flexure of said first annual member.

2. The harmonic drive linear actuator of claim 1, wherein said first and second annular members are longitudinally elongated.

3. The harmonic drive linear actuator of claim 1, wherein said first annular member is disposed radially inwardly of said second annular member.

4. The harmonic drive linear actuator of claim 1, wherein said second annular member is relatively rigid along said direction which lies on said plane.

5. The harmonic drive linear actuator of claim 1, further comprising means to limit axial displacement of one of said annular members with respect to an adjacent grounded structure.

6. The harmonic drive linear actuator of claim 5, wherein the other of said annual members defines means for urging a load in at least one direction parallel to said longitudinal axis.

7. The harmonic drive linear actuator of claim 1, wherein said means for flexing the first annual member is operable to effect selective bi-directional relative longitudinal displacement between said first and second annular members.

8. The harmonic drive linear actuator of claim 1, wherein said first and second annual members are disposed substantially concentrically.

9. The harmonic drive linear actuator of claim 1, wherein one of said thread-forms comprises at least one circumferential groove disposed substantially parallel to said plane.

10. The harmonic drive linear actuator of claim 1, wherein one of said thread-forms comprises a plurality of circumferential grooves arranged along the entire axial extent of the annual member associated therewith.

11. The harmonic drive linear actuator of claim 1, wherein one of said thread-forms comprises at least one axially extending helix.

12. The harmonic drive linear actuator of claim 1, wherein said second annular member defines a relatively rigid, generally cup-shaped structure.

13. The harmonic drive linear actuator of claim 12, wherein said first annual member and said means for flexing said first annual member are disposed substantially within said second annular member.

14. The harmonic drive linear actuator of claim 1, wherein said means for flexing the first annular member is responsive to an electrical control signal, and is operative to effect radial disengagement of said thread-forms in response to the absence of said electrical control signal, whereby said first and second annular members are freely axially displacable with respect to one another.

15. The harmonic drive linear actuator of claim 1, wherein said first annular member is resilient and returns to a substantially cylindrical configuration when not being acted upon by said flexing means.

16. The harmonic drive linear actuator of claim 1, wherein said first annular member comprises electromagnetic material.

17. The harmonic drive linear actuator of claim 16, wherein said flexing means comprises an electromagnetic actuator operable to selectively apply magnetic attractive forces to opposed portions of said first annular member to effect said sequential flexure.

18. A harmonic drive linear actuator comprising:

a first annular member having a longitudinal axis and lying on a plane perpendicular to said axis, and wherein said first member is relatively flexible in directions parallel to the plane;

a second member substantially coaxially aligned with the first member, said members defining opposed complimentary surfaces and are fixed for non-relative rotation about said axis; and means for flexing the first member into at least two spaced-apart points of contact between said surfaces and for sequentially flexing the first member to rotate the at least two points of contact about the axis, said surfaces defining cooperating thread-forms thereon extending circumferentially about said longitudinal axis which selectively engage to effect relative axial displacement between said members.

19. A brake caliper apparatus, comprising:

a brake caliper for applying a clamp load along an actuation axis;

a piston slidably disposed in a bore concentric with said axis for applying said clamp load; and a harmonic drive linear actuator disposed for acting upon said piston and an opposed substantially grounded caliper surface, said linear actuator comprising a first annular member having a longitudinal axis and lying on a plane perpendicular to said longitudinal axis, and wherein said first member is relatively flexible in directions parallel to said plane, a second member substantially coaxially aligned with said first member, said members defining opposed complimentary surfaces and are fixed for non-relative rotation about said longitudinal axis, means for flexing the first member into at least two spaced-apart points of contact between said surfaces and for sequentially flexing the first member to rotate the at least two points of contact about the longitudinal axis, said surfaces defining cooperating thread-forms thereon extending circumferentially about said longitudinal axis which selectively engage to effect relative axial displacement between said members and application of said clamp load.

20. The brake caliper apparatus of claim 19, where said piston and linear actuator are conjoined as a single assembly disposed within said bore.

21. The brake caliper apparatus of claim 19, wherein said piston and second member are integrally formed as a cup-shaped structure.

22. The brake caliper apparatus of claim 19, wherein said first member is carried by said flexing means, and said flexing means is groundingly affixed to said caliper surface.

* * * * *